Aug. 9, 1932.  H. A. LUDEKE  1,870,919
CULTIVATOR
Filed Aug. 20, 1931  5 Sheets-Sheet 5
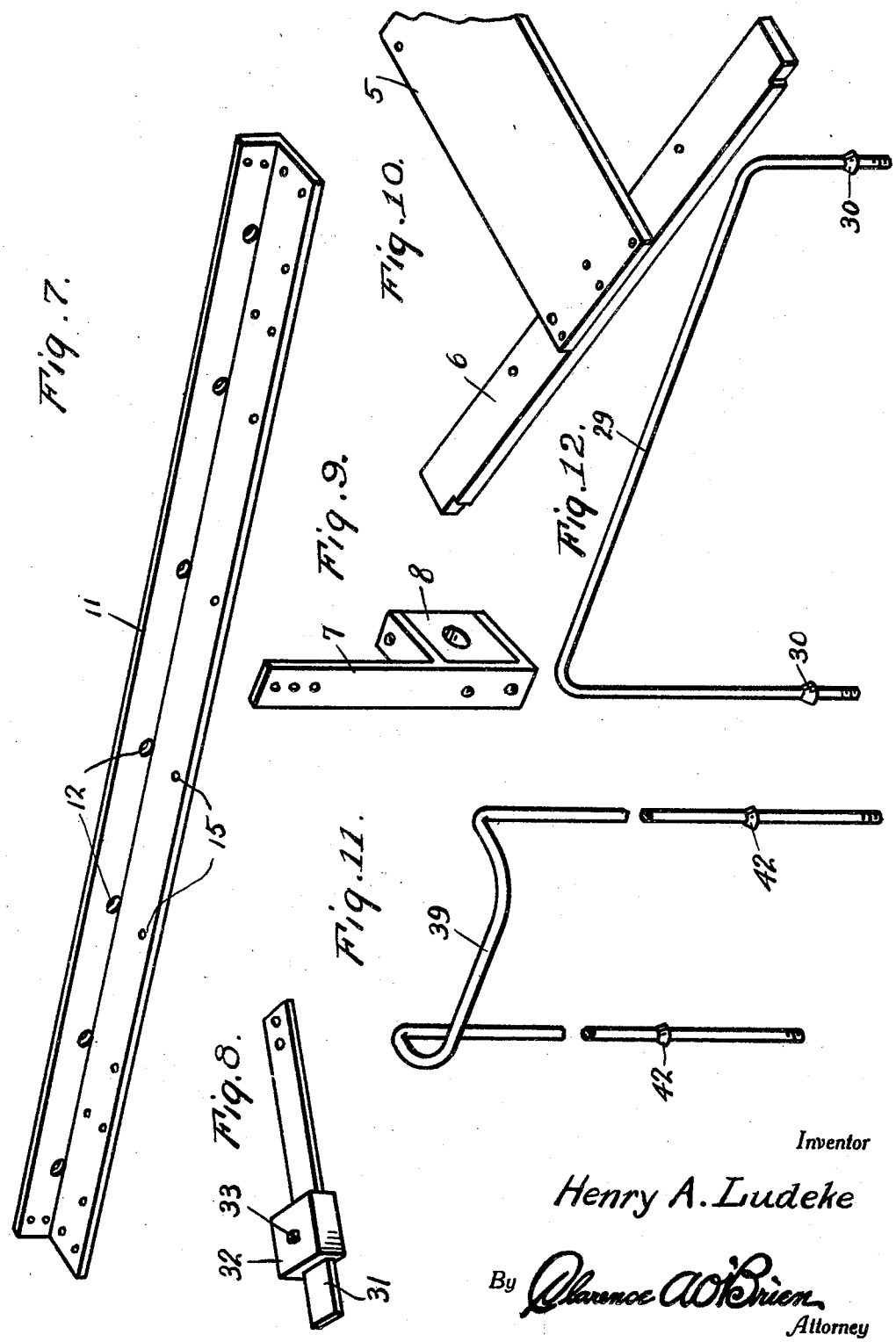
Inventor
Henry A. Ludeke
By Clarence A. O'Brien
Attorney Patented Aug. 9, 1932

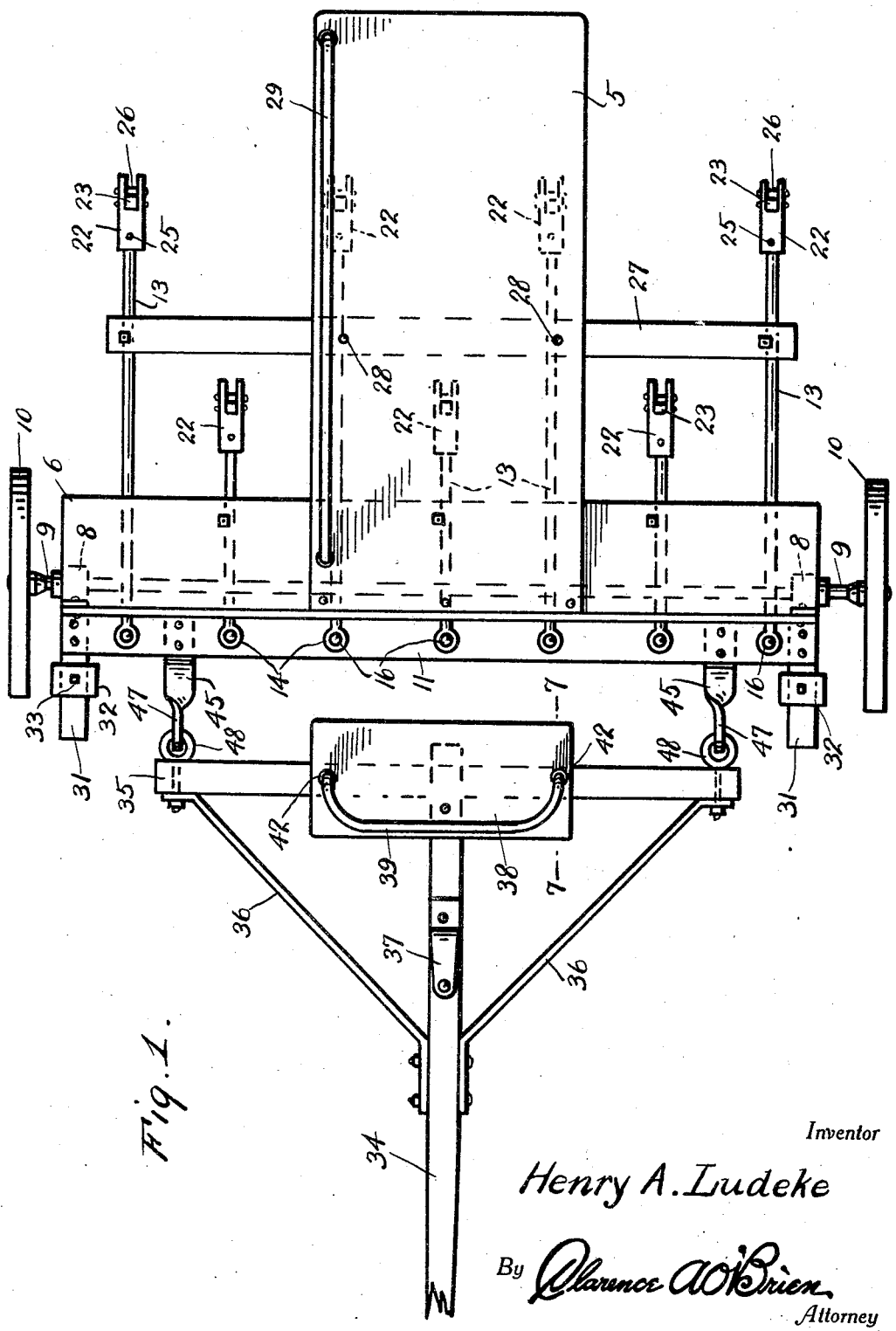

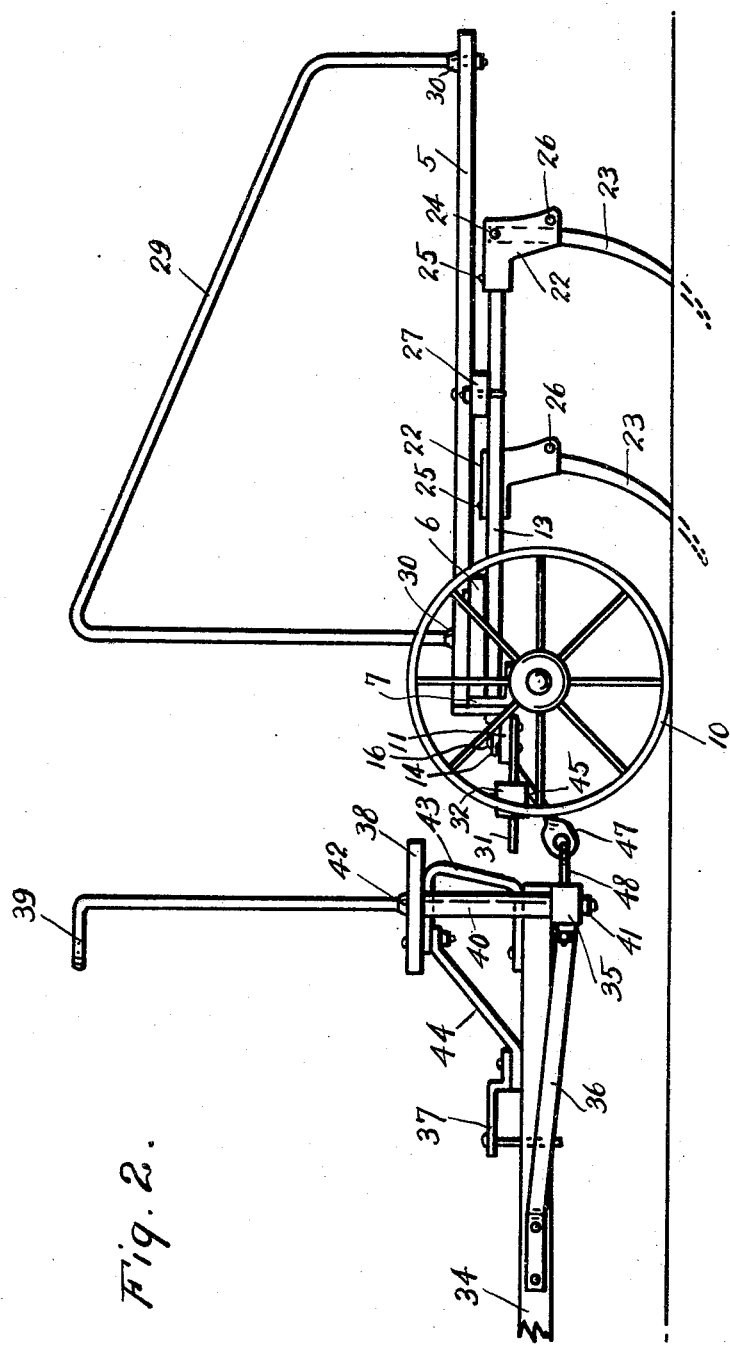

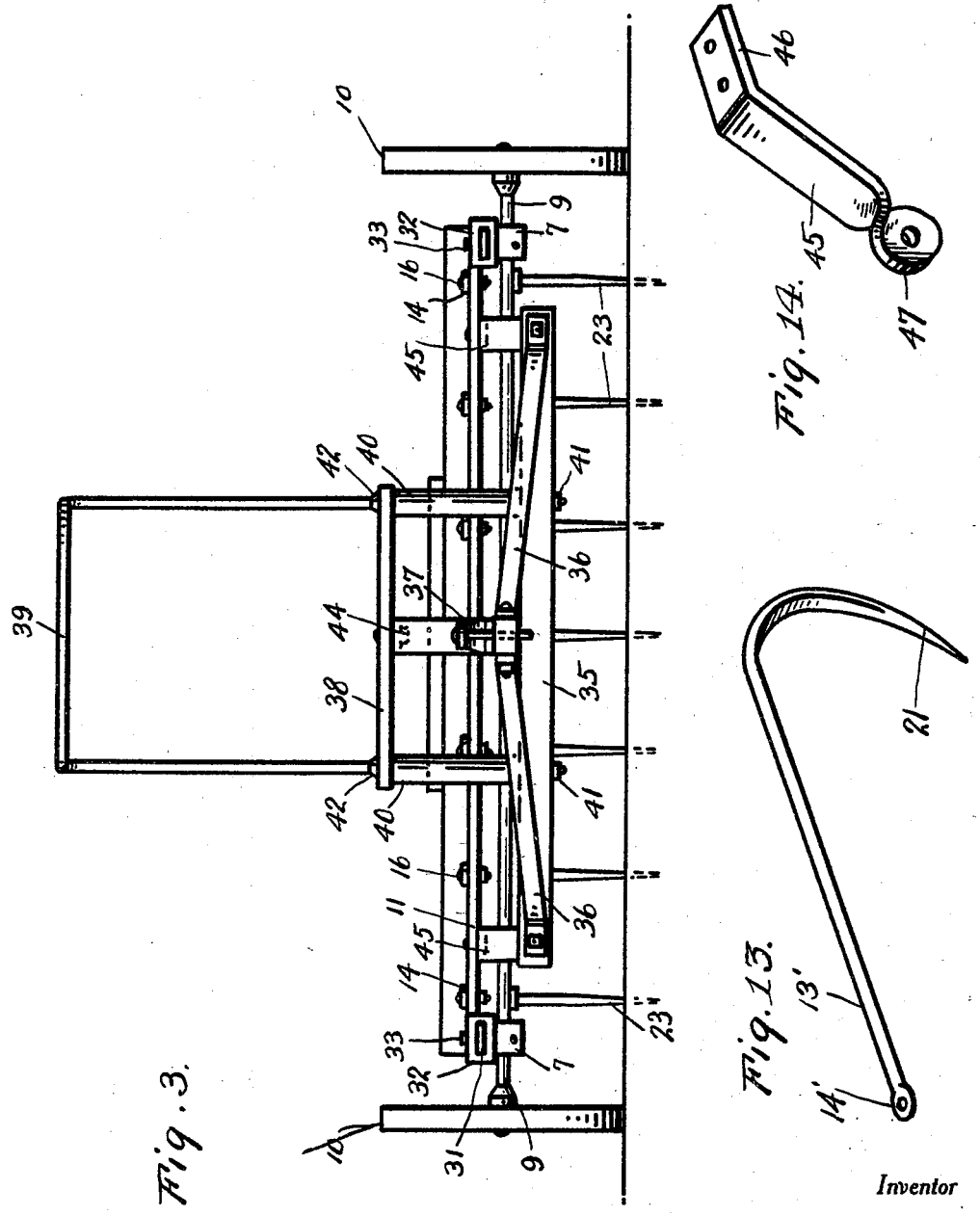

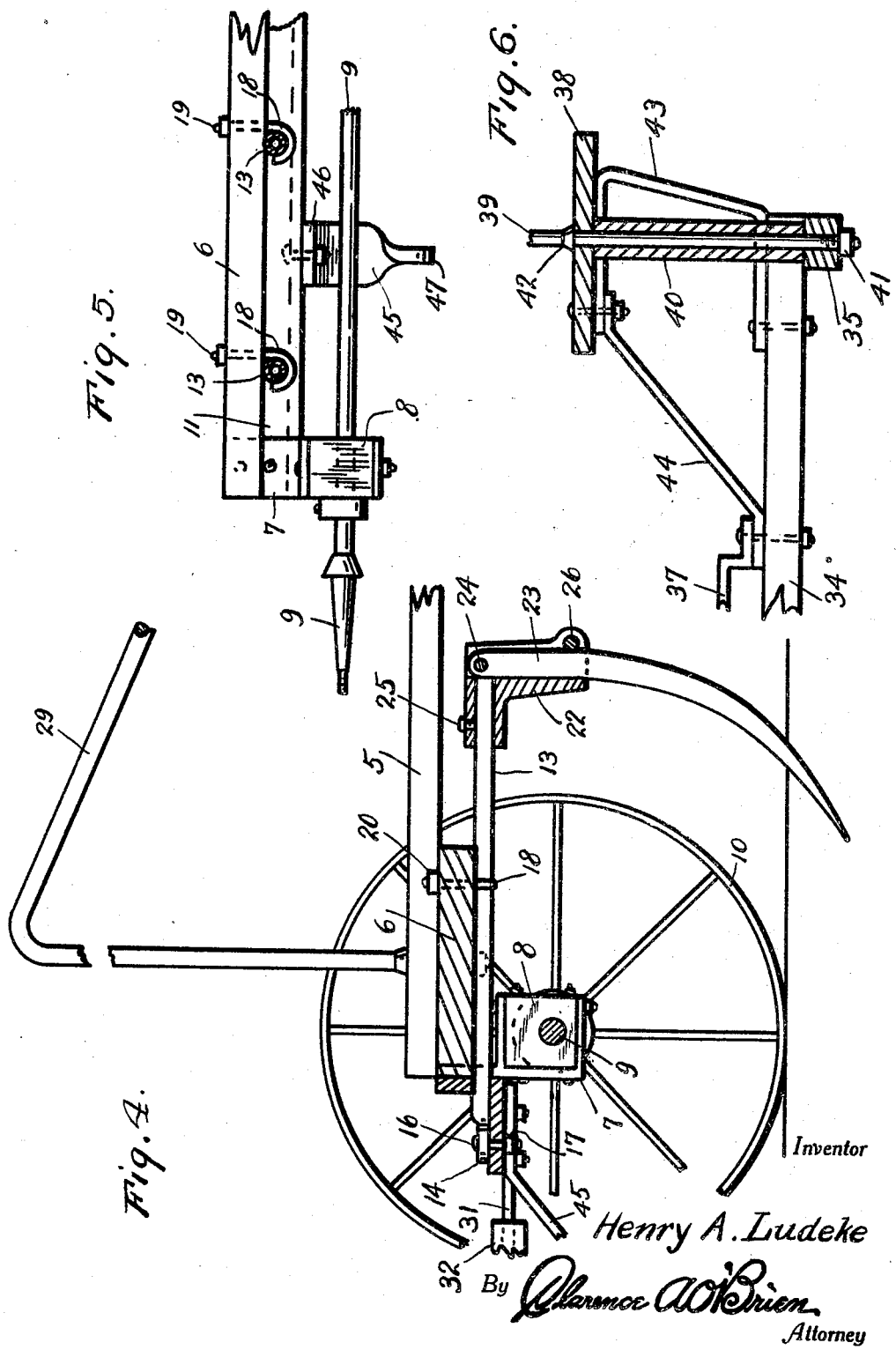

1,870,919

UNITED STATES PATENT OFFICE

HENRY A. LUDEKE, OF GARNER, IOWA

CULTIVATOR

Application filed August 20, 1931. Serial No. 558,383.

This invention relates to new and useful improvements in cultivators, and more particularly to a machine especially adapted for lifting quack grass and alfalfa.

The principal object of the invention is to provide a machine of the character mentioned wherein the ground engaging elements can be elevated or lowered by the mere shifting of human weight on the machine.

Another important object of the invention is to provide a cultivator wherein the ground engaging elements are regulated by human weight shiftable on the machine in a safe and effective manner.

Other important objects and advantages of the invention will become apparent to the reader of the following specification.

In the drawings:—

Figure 1 represents a top plan view of the machine.

Fig. 2 represents a side elevational view of the machine.

Fig. 3 represents a front elevational view of the machine.

Fig. 4 represents a fragmentary vertical sectional view through the machine.

Fig. 5 represents a fragmentary detailed sectional view showing the means for retaining the implement shank.

Fig. 6 represents a fragmentary detailed sectional view taken substantially on the line 7—7 of Fig. 1.

Fig. 7 represents a perspective view of the implement supporting angle bar.

Fig. 8 represents a perspective view of the weight means.

Fig. 9 represents a perspective view of one of the journal brackets.

Fig. 10 represents a fragmentary perspective view of the rear platform.

Fig. 11 represents a perspective view of the front hand rail.

Fig. 12 represents a perspective view of the rear hand rail.

Fig. 13 represents a perspective view of a modified form of cultivator element.

Fig. 14 represents a perspective view of one of the draft connectors.

Referring to the drawings wherein like numerals designate like parts, it can be seen that numeral 5 represents the rear platform which is provided with the cross member 6 at its forward end, projecting a substantial distance beyond opposite sides thereof. The forward corners of the cross member 6 are cut away to receive the upper ends of the inverted F-shaped brackets 7, between the projections of which are secured the journal blocks 8 through which the ends of the axle 9 are disposed and equipped with the ground engaging wheels 10.

Secured at its ends to the front sides of the bracket 7 is the angle bar 11 provided at uniform spaced intervals with openings 12 in its upstanding flange to receive the implement shank 13, each of which is provided with an eye 14 at its forward end for registry with a corresponding opening 15 in the horizontal flange of the bar 11, so that a bolt 16 and nut 17 can be employed for positively securing the shank against displacement.

A further means for securing the shank in its displacement includes the hook 18 engaged under the shank 13 with the threaded portion 19 thereof projecting upwardly through a corresponding opening in the cross member 6 where it is equipped with a nut 20. The form of cultivator element shown in Fig. 14 includes a shank 13' with an integral ground engaging element 21 at one end and the eye structure 14' at its opposite end. However, the form of cultivator element shown in Fig. 5 which is the preferred form for such purposes, includes the L-shaped coupling 22 used invertedly as shown at Fig. 5 with its rear side grooved to receive the upper portion of the tooth 23.

The horizontal upper portion of the coupling 22 is hollow to receive the rear end of the corresponding shank 13 which is pivotally connected at its rear end by the pin 24, to the upper end of the tooth 23. A setscrew 25 in the upper portion of the coupling structure 22 serves to retain the shank 13 against displacement. The break pin 26 across the channeled side of the coupling structure 22 and the rear side of the tooth 23, so that in the event undue force is applied to the tooth, the same will readily give on pivot pin 24 by first breaking the break pin 26.

As is shown in Fig. 1, the shanks 13 are alternately long and short, so that the teeth are in a pair of longitudinally spaced rows, the longer shanks 13 being connected by a cross bar 27. The intermediate portion of the aforementioned platform 5 rests upon the cross bar 27 and is suitably secured thereto as at 28. A hand rail 29 has its intermediate portion inclined forwardly while its end portions are bent downwardly for attachment to the platform 5, as at 30.

Arms 31 project forwardly from the angle bar 11 and each has a weight block 32 adjustable thereon by the set screw 33. Obviously, this weight 32 can be adjusted on the arm to compensate for the difference in weight between individuals manipulating the machine. At this point, it will be observed that the foregoing construction is entirely rockably supported on the axle 9.

Numeral 34 represents the usual draft beam which at its rear end is provided with the usual cross beam 35 braced to the beam 34 by the straps 36—36. Upon the pole 34 is the usual draft clevis 37 and in further carrying out the present invention, a platform 38, somewhat smaller than the platform 5, but of approximately the same width, is secured above the cross beam 35 by the U-shaped rail 39. This rail has its leg portion disposed through openings in the forward platform 38 and thru the vertical spacers 40, projecting upwardly from the cross beam 35 to pass thru corresponding openings in the cross beam, where they are equipped with nuts 41 to prevent displacement, and to maintain the rail and platform in a steady upright position as shown in Fig. 2.

Suitable stop enlargements 42, can be provided at points inwardly from the lower ends of the leg portions.

A U-shaped spring support 43 has one leg secured to the pole 34, while its other leg is secured to the bottom side of the platform 38. A brace 44 is interposed between the upper end of the U-shaped support 43 and the pole 34 at a point forwardly thereon from the platform 38. Thus the platform 38 is supported staply in place upon the pole 34, and in the operation of the machine, it can be observed, that if the teeth are to bite into the ground, the attendant will stand on the intermediate portion of the platform 5 and depending upon the depth of the cultivation, the attendant will shift his weight forwardly or rearwardly on the platform 5, forwardly to release the teeth, and rearwardly to cause the teeth to sink further into the ground.

Connectors 45 are provided between the angle bar 11 and the cross beam 35 adjacent the ends of the cross beam, and each includes a bar which is bent obliquely at one end, as at 46, for attachment to the bottom side of the angle bar 11 and twisted to a right angular position at its opposite end and provided with an eye 47 for receiving the eye bolt 48 on the corresponding end of the cross beam 35. Thus the rear assembly of the machine is attached to the forward assembly, the platform 5 being on the rear assembly, and the platform 38 being on the forward assembly.

In further operation of the machine, when it is desired that the teeth be lifted from the ground, the attendant merely steps from the platform 5 onto the platform 38 and to prevent falling, grasps the rail 39. This shifting of the weight from the platform 5 onto the platform 38 will, obviously, rock the platform 5 in an opposite direction, resulting in the lifting of the teeth 23 from the ground.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A cultivator comprising a laterally extending member, a platform attached to said member and extending rearwardly therefrom, a pair of journal blocks, one of said blocks being of each outward extremity of the laterally extending member, an axle disposed through the journal blocks and provided with ground engageable wheels, cultivator elements carried by the laterally extending member, a forward platform, a link connection between the forward platform and the rearwardly extending platform, and weight counter-balancing means on the rearwardly extending platform.

2. A cultivator comprising a laterally extending member, a platform attached to said member and extending rearwardly therefrom, a pair of journal blocks, one of said blocks being at each outward extremity of the laterally extending member, an axle disposed through the journal blocks and provided with ground engageable wheels, cultivator elements carried by the laterally extending member, a forward platform, a link connection between the forward platform and the rearwardly extending platform, weight counter-balancing means on the rearwardly extending platform, said weight counter-balancing means comprising a forwardly projecting arm on the rear platform, and a slidable weight adapted to be adjusted and fixed on the arm.

In testimony whereof I affix my signature.

HENRY A. LUDEKE.